INVENTOR
Egbertus Adrianus Frowein
BY Pierce, Scheffler & Parker
ATTORNEYS

United States Patent Office 3,390,241
Patented June 25, 1968

3,390,241
GAS CIRCULATING SYSTEM FOR COMPRESSED GAS OPERATED CIRCUIT BREAKERS
Egbertus Adrianus Frowein, Nussbaumen, Aargau, Switzerland, assignor to Aktiengesellschaft Brown, Boveri & Cie., Baden, Switzerland, a joint-stock company
Filed Oct. 20, 1965, Ser. No. 498,466
Claims priority, application Switzerland, Oct. 23, 1964, 13,779/64
5 Claims. (Cl. 200—148)

The present invention relates to electrical power switches of the compressed gas operating type and more particularly to such a switch in which the gas is circulated in a closed system so that the same gas is used over and over again in the interest of economy, the gas itself, being a relative expensive item.

The gas circulating system for a pressure-gas power switch of a known design usually consists essentially of a low-pressure tank surrounding the load breaking device of the switch and a high-pressure accumulator for the quenching gas, e.g. sulphur-hexa-fluoride. The system operates in a closed i.e. recirculating circuit with a constant amount of gas. A compressor supplies the quenching gas that overflows into the low-pressure tank at each switching process, then it is conveyed back into the high-pressure accumulator, namely under the influence of a device that controls the maintenance of a constant difference between the pressure in the low-pressure tank and high-pressure accumulator. By a monitoring arrangement in the form of a pressure-difference controller, the compressor is switched on when the pressure-difference determining the switching capacity of the power switch has fallen short of the critical value after switching process or upon a drop in temperature of the gas. On the other hand, an over-pressure valve between the high-pressure accumulator and low-pressure tank serves for the purpose that gas from the high-pressure accumulator can overflow into the low-pressure tank at a rising temperature and thus the too high pressure difference is reduced again to the desirable value.

If leakage points arise in such a gas re-circulating system through which the gas can escape and the lost gas cannot be restored in normal operation of the system, it may occur that the pressure level drops uniformly in the high pressure accumulator and in the low-pressure tank, while the pressure difference remains constant so that the provided control devices do not function. If, under these circumstances, the gas pressure in the low-pressure tank drops below the minimum value required for satisfactory electrical insulation there thus arises the risk of a breakdown which can lead to the destruction of the power switch. The formation of leakage points is now throughout within the framework of possible sources of error. Inspections of each switch of this type must be performed regularly which among other things requires the low-pressure tank to be opened and closed again. A possible damage to the closure packing is no way eliminated on such occasions as proved by the experience therewith. Hence, the gas re-circulating system cannot be regarded as entirely leakproof so that even an essential assumption for a reliable operation of the switch plant does not come into consideration.

Another deficiency of the known gas re-circulating systems ensues from the fact that at periodical intervals, the gas is drawn off and replaced by new gas. Here it is very difficult to ascertain whether the gas volume upon renewal has actually attained the magnitude required for satisfactory operation of the switch. The pressure level in the high-pressure accumulator and in the low-pressure tank is known to be strongly dependent on temperature. The pressure level can, of course be determined in a simple way, e.g. with a manometer; on the other hand, a measurement of the gas temperature even with a moderate degree of accuracy is hardly possible within a short time. Consequently, large deviations can appear in the gas filling which, e.g. after insufficient filling in a warm season, can cause a drop in the gas pressure in the low-pressure tank below the minimum required during cold weather. This may also cause electrical insulation difficulties in the circuit breaker.

Starting from the novel concept that said disadvantages can be obviated by controlling the pressure level in the low-pressure tank it is suggested, according to the invention, for a closed gas system comprising pressure-gas power switches of the aforementioned type, to connect the low-pressure tank to a gas supply plant and to provide, for maintenance of a constant gas volume in the circulation system, a pressure controller for the low-pressure part of the system which exhibits a characteristic consistent with the pressure-temperature development for constant gas volumes, and which in case of need would regulate the gas input from the gas supply plant or regulate the gas discharge.

The measure suggested by the present invention offers the following advantages: An automatic re-feeding of gas ensues at a too low gas pressure in the low-pressure tank e.g. by gas discharge into the environment. If the gas pressure is too high e.g. due to unintended gas inflow from other parts of the plant, gas is thus automatically discharged. After an inspection of the gas system, or upon a gas renewing operation, the gas is automatically filled again in the required amount. Gas overflowing from or into the low-pressure tank caused by casual leakage spots can be indicated and localized by inspection in the time period during which the re-feeding or discharge valves actuate.

One suitable embodiment of the invention will be explained in detail by way of the following specification and the accompanying drawings wherein.

Figure 1:
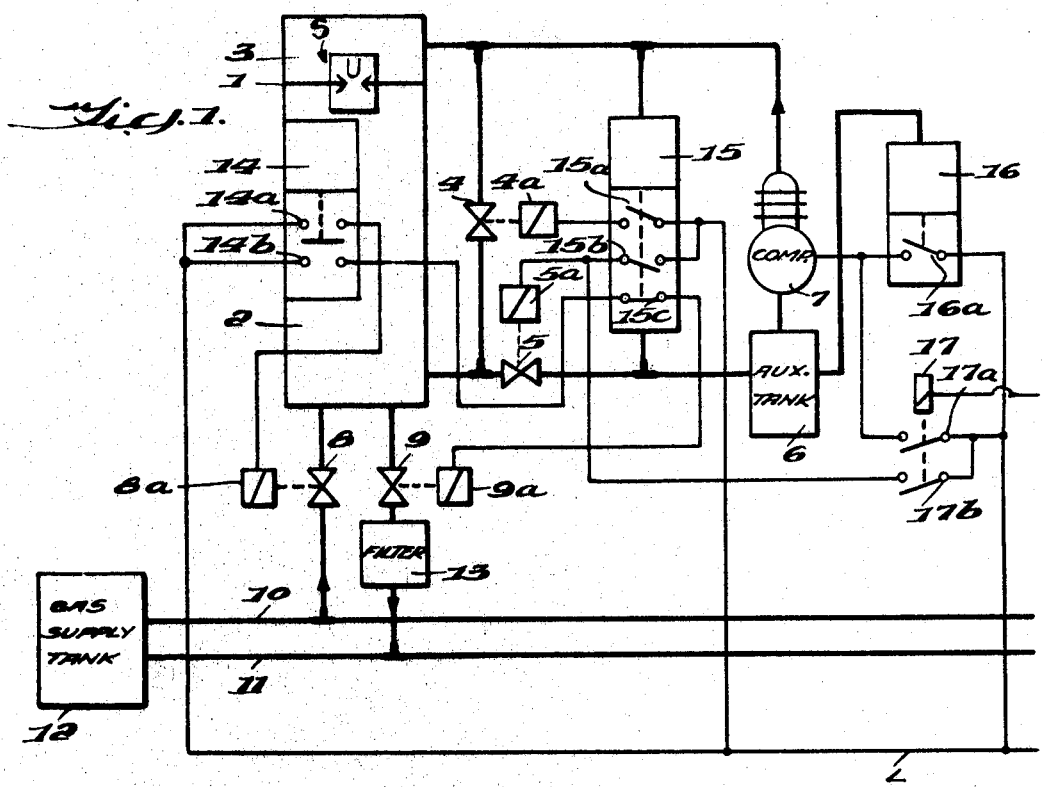
FIGURE 1 shows schematically a gas circulating system for a pressure-gas power switch designed according to the invention.

With reference now to FIGURE 1, in the outline of the gas circulating system represented, gas lines are designated by thick lines while current supply lines for the electric controls are designated by thin lines.

The part 1 of the system belonging to the power switch comprises the low-pressure tank 2 and the high-pressure accumulator 3 which are internally connected by the arc-quenching chamber of the load breaking device S of the switch. Besides, an exterior by-pass connection between low-pressure tank 2 and the high-pressure accumulator 3 exists through a valve 4 that is normally closed but opens at too great a difference between the respective pressures in the low-pressure tank 2 and high-pressure accumulator 3. Another similar connection leads from the low-pressure tank 2 to the high-pressure accumulator 3 through a normally closed valve 5, an auxiliary tank 6 in the low-pressure part and a compressor 7. The valve 5 serves for the switching on of the compressor as described in further detail below. Furthermore the low-pressure tank 2 is connected through normally closed valves 8 and 9 to the gas supply line 10, and to the gas return line 11 respectively of a gas supply plant 12 that is not described in detail. A filter 13 for cleaning the switching gas is connected in the line with valve 9 at the outlet side. Valves 4, 5, 8 and 9 are controlled by solenoids and these are designated on the drawing by 4a, 5a, 8a and 9a respectively.

Three pressure controllers 14, 15 and 16 are provided for the control of the required pressure conditions in the gas circulating system. The pressure controller 14 is disposed in the low-pressure tank 2 and possesses a characteristic consistent with the pressure-temperature development for constant gas volumes. It serves for maintenance of a constant gas volume in the circulating system and for this purpose, controls relay contacts 14a, 14b which control energization of solenoids 8a, 9a which in turn regulate operation of valves 8 and 9 respectively for the supply, or return, of gas. A pressure difference controller 15 inserted in the outer circuit between the low-pressure tanks 2 and the high-pressure accumulator 3, supervises through relay contacts 15a, 15b the operation of solenoids 4a, 5a and hence the operation of the valves 4 and 5, and controls the required difference between high and low pressure. Finally, the pressure controller 16 which is actuated after attainment of an upper pressure limit in the low pressure part is utilized for the switching on of the compressor 7 through its relay contacts 16a. Furthermore, a relay 17 with a delayed opening characteristic and contacts 17a, 17b is utilized which is actuated with each switch command for the power switch and effects, after each switching process, a return of the switching gas from the low-pressure tank 2 into the high-pressure accumulator 3.

Pressure controller 15 also controls a third set of relay contacts 15c which are included in the energizing circuit for solenoid 9a. Power for energizing the solenoids 4a, 5a, 8a, and 9a as well as the electrically driven compressor 7 is obtained from supply lines L, only the "hot" one of which is depicted. The other line can be grounded if desired, along with one side of the winding of each of the solenoids and compressor motor control.

Relay contacts 14a, 14b are closed alternatively. Thus when relay contacts 14a are closed, an energizing circuit from line L is completed through such contacts to solenoid 8a to thus open valve 8 between gas supply line 10 and low-pressure tank 2. When relay contacts 14b are closed, an energizing circuit from line L is completed through such contacts to solenoid 9a by way of relay contacts 15c, when closed, to thus open valve 9 between the gas return line 11 and low-pressure tank 2.

Relay contacts 15a and 15b when closed by operation of controller 15 responsive to the pressure within the high-pressure accumulator 3 serve to effect energization of the solenoids 4a and 5a respectively from line L which in turn control operation of valves 4 and 5.

Relay contacts 17a when closed serve to complete a second energizing circuit from line L to the motor control for turning on compressor 7, this energizing circuit being in parallel with the other energizing circuit through relay contacts 16a. Relay contacts 17b, when closed serve to complete a second energizing circuit from line L to solenoid 5a, this energizing circuit being in parallel with the other energizing circuit for this solenoid through relay contacts 15b.

The improved gas circulating system operates in the following manner:

In conjunction with the disconnecting process in the power switch tripped by an impulse switch command, a certain amount of quenching gas will flow from the high-pressure accumulator 3 into the low-pressure tank 2. At the same time, relay 17 is momentarily actuated but which due to its breaking delay keeps its contacts 17a, 17b closed for a while even after the disappearance of the switch command. Upon closing these contacts 17a, 17b, valve 5 is opened and compressor 7 is put into operation. The pressure in the auxiliary tank 6 rises to the level just prevailing in the low-pressure tank 2 so that the pressure-difference controller 15 is actuated due to the too low difference pressure and upon de-activation of relay 17 assumes through its closed relay contacts 15b the regulation of the valve 5. The pressure rise in the auxiliary tank 6 causes also the actuation of the pressure controller 16 that now takes over through its closed relay contacts 16a the regulation of the compressor 7 from relay 17. Only after these actions does the relay 17 return to its state of rest with its contacts 17a, 17b open. The compressor 7 pumps gas from the low-pressure tank 2 into the high-pressure accumulator 3 until the required pressure difference has been re-established, whereupon, the pressure difference controller 15 returns the valve 5 to the closed state by opening contacts 15b. The auxiliary tank 6 is subsequently pumped by the compressor 7 until it has been emptied and the pressure controller 16 falls back into the state of rest due to the drop in pressure and thus the compressor 7 is put out of service as relay contacts 16a open.

With an excessively rising gas temperature, the critical pressure difference grows so quickly that the pressure difference controller 15 responds and closes contacts 15a. In this case valve 4 is opened and thus the required pressure balance between the high and low pressure parts is brought about. As soon as the prescribed pressure difference has been re-established, the pressure difference controller 15 reaches its balanced position and the valve 4 is closed again as relay contacts 15a re-open.

If the gas temperature drops below a certain value, the pressure difference controller 15 is actuated due to the too low pressure difference now prevailing. Accordingly relay contacts 15b close, the valve 5 is opened and and the gas from the low pressure tank 2 flows into the auxiliary tank 6 through said valve until the pressure therein has risen so much that even the pressure controller 16 responds to close relay contacts 16a. This now switches on the compressor 7 whereby further processes are initiated which run off as in the case of a switch manipulation.

The pressure controller 14 for the maintenance of a constant gas volume in the gas circulating system provided according to the invention, comes into action when gas flows away through leaky points from the system into the environment or other parts of the plant, or penetrates the system from outside and the actuation of the pressure controller 14 is effected independently of the operating temperature of the gas in the low-pressure tank 2, as expected. A practical construction of such a pressure controller is described further below.

Should the gas circulating system lose gas due to a leakage, the pressure controller 14 is actuated as soon as the gas pressure in the low-pressure tank 2 falls below the permissable lower limit. Consequently the valve 8 is opened when relay contacts 14a close and gas then flows from the gas supply plant 12 to the low-pressure tank 2 through the supply line 10 and the open valve 8. When the required pressure level in the low-pressure tank has been reestablished, the relay contacts 14a of pressure controller 14 are disconnected and the valve 8 is closed again as solenoid 8a becomes de-energized.

After exceeding an upper pressure limit in the low-pressure tank 2, pressure controller 14 is likewise actuated in the opposite direction to close relay contacts 14b. If the pressure difference controller 15 is in state of rest at this moment, that means that the pressure rise in the low-pressure tank has not been created as a result of a switch manipulation of the power switch, the energizing circuit for the solenoid 9a controlling actuation of the valve 9 running through the rest contacts 15c of the pressure difference controller 15 then being closed. The surplus gas can flow into the gas supply plant 12 only through the open valve 9, filter 13 and the return line 11, whereupon the pressure controller 14 will arrive again at a state of rest and the valve 9 is again closed as soon as relay contacts 14b reopen.

For discharge of the gas prior to an inspection or overhauling, the normal control is put out of operation; valves 4 and 9 are opened, and the gas is pumped into the gas supply plant 12 through the return line 11. For the renewal of the gas filling, the air is first removed from the circulation system with a vacuum pump, then the normal control can be put back into operation. The filling process ensues automatically in the same way as in the case of the described re-feeding due to gas loss.

The gas circulating systems for several pressure gas power switches can be connected to the lines 10 and 11 of the gas supply plant 12. In order to ascertain, if necessary, which of the systems leaks or is supplied with gas, counters (not designated) are attached to the actuating organs of the valves 8 and 9. Based upon the reading of these counters it is possible to determine place and type of an error within certain limits.

The construction of a pressure controller of the desired characteristic for control of the low-pressure part of the gas circulating system can best be explained by reference to the pressure-temperature diagram according to FIG. 2 which applies to sulphur hexafluoride. This diagram contains, on the one hand, a set of curves which represents the course of the pressure as a function of the temperature, with the specific weight or the constant density of the gas as joint parameter. From the gas-equation $P.v=RT$, ensues $P=RT$, and $R=a$ constant, with the density as joint parameter.

The lines AB and CD show on the other hand the temperature dependence of the gas pressure in the low-pressure tank 2, or in the high-pressure accumulator 3 with a constant volume. Here ensues from the equation $P=P_0(1+t)$, the equation $$P=\frac{P_0}{T_0}\cdot T$$

The lines $A_1B_1$ and $A_2B_2$, or $C_1D_1$ and $C_2D_2$, correspond to the permissible deviations (e.g. ±5%) of the gas amount in the system of normal value downwardly and upwardly as it is expressed in the value of the pressure P. The pressure difference between high and low-pressure parts should, in general, remain constant within the determining temperature range of for example, 10° C. up to 85° C., and amount, for example to 10 atmospheres.

One of the main functions of the novel pressure controller in the low-pressure tank consists in the prevention of a reduction of the gas pressure below the limit level guaranteeing an adequate electrical insulation of the "live" switch parts. This limit level appears in the pressure-temperature diagram of FIG. 2 as a line of constant gas density (dashed line $A_2K$).

According to the invention, the pressure controller should exhibit a characteristic, consistent with the line AB. As demonstrated by the diagram, the lines for constant gas volume and constant pressure difference in the high-pressure zone are less steep, while they are steeper in the low-pressure zone than the lines for constant gas densities. Between both pressure zones it is always possible to find a line for constant gas densities, e.g. EF in FIG. 2 which runs parallel to the line AB for constant gas volumes.

Considering this fact, there exists the possibility of applying a pressure controller which itself exhibits a characteristic properly along the line EF. It is known that a so-called constant-density-relay is distinguished by its simple, robust and safe construction in operation. The required temperature-independent compensation of the pressure difference corresponding to the spacing of the lines EF and AB can be effected in a simple way by the resilience of a spring. Thus a pressure controller is formed with the desired characteristic AB.

Figure 3:
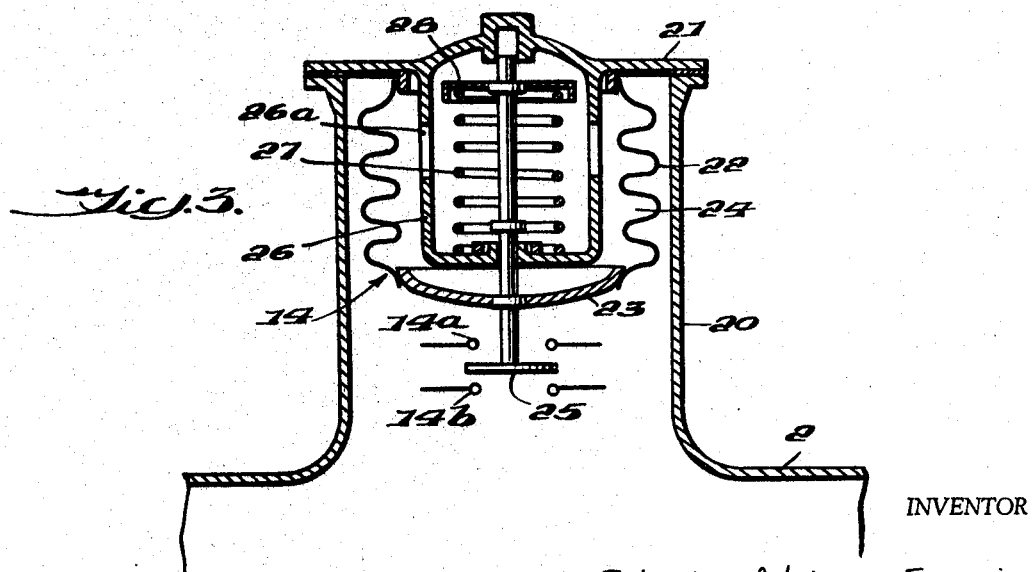
FIG. 3 is a sectional view of a part of the low-pressure tank illustrating one suitable construction for the pressure controller.

A pressure controller 14 constructed in this manner by way of an example is represented in central section in FIG. 3. The pressure controller is disposed as an entity in a short feed pipe 20 of the low-pressure tank 2. On the underface of cover plate 21 closing this feed pipe, one end of a bellows 22 is fastened and which latter is terminated at its opposite free end by a closure plate 23.

Figure 2:
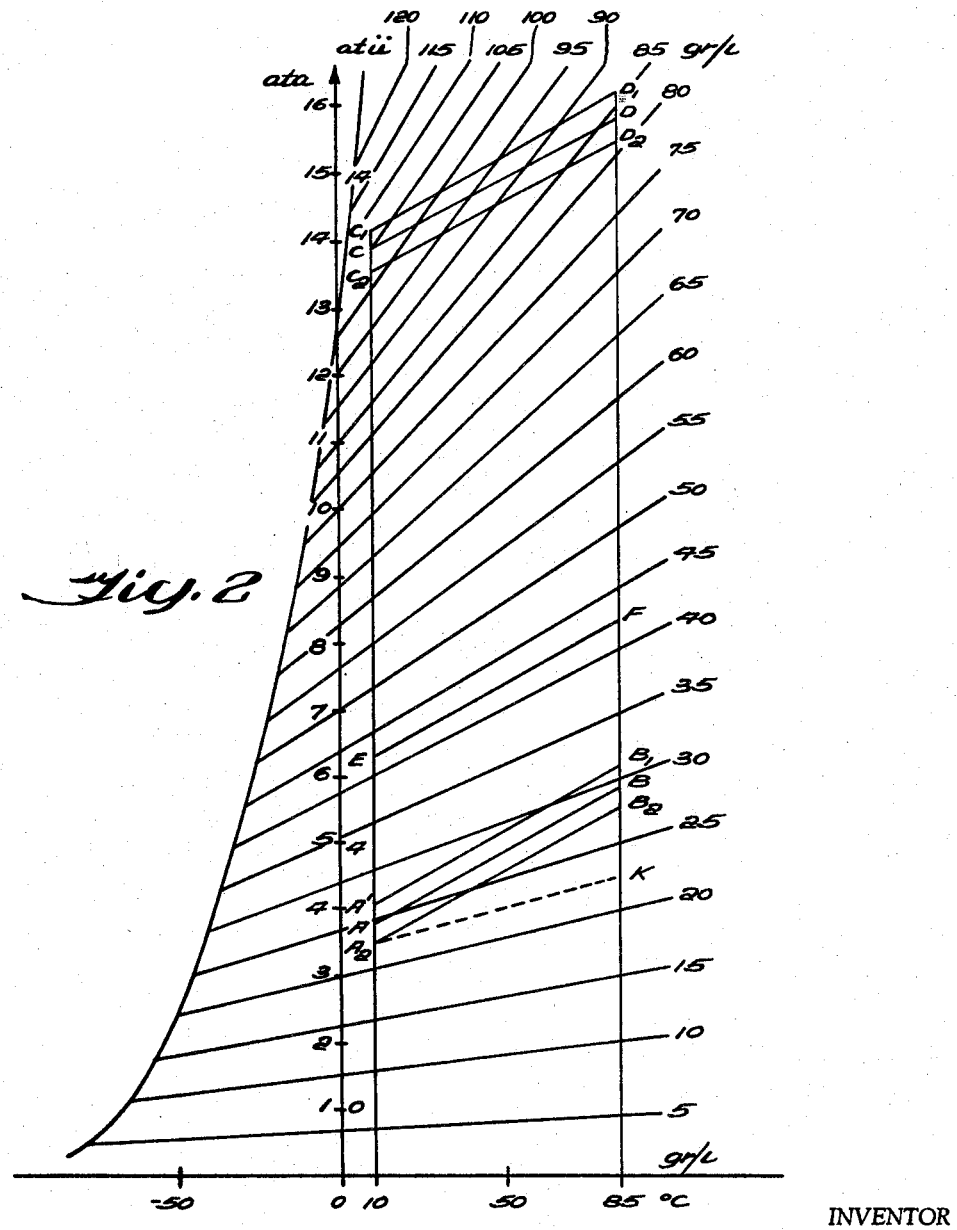
FIG. 2 represents a pressure-temperature diagram for explanation of the manner of operation of the pressure controller for a specific gas filling of the low-pressure part of the system.

Located with the space 24 enclosed by cover plate 21, bellows 22 and closure plate 23 is found gas having a pressure level corresponding to line EF in FIG. 2. Within bellows 22 and also depending from the underface of cover plate 21 is a housing 26, having its side wall ported at 26a so that the same pressure prevails on the inside as well as on the outside. Housing 26 is utilized to support within it a helical compression spring 27 which surrounds an operating rod 25 extending through the lower end wall of housing 26 and also through the closure plate 23 of the bellows 22, the rod 25 terminating in a relay contact bridging bar for the stationary relay contacts 14a, 14b. The operating rod 25 extends freely through the lower end wall of housing 26, i.e. with clearance, but is secured fast to closure plate 23 so that rod 25 undergoes the same movement as bellows 22. Such movement is counteracted by the restoring force exerted by compression of spring 27, it being noted that the lower end of the spring bears against the lower end of housing 26 while the upper end of the spring bears against a retainer plate 28 secured to the upper end of rod 25.

Furthermore it is possible to apply relays with characteristics for constant gas volumes in the manner described before for the control of bus bars, isolating switches, voltage transformers and other similar devices.

I claim:

1. In a pressure gas operated electrical power switch having a closed gas circulating system, the combination comprising a low-pressure tank, a high-pressure accumulator, said tank and accumulator being internally communicable with each other through the quenching chamber of the load breaking switch contacts only upon disconnection of said contacts, thereby to establish a flow of gas from said accumulator to said low-pressure tank, a gas line extending between said low-pressure tank and high-pressure accumulator, said gas line including a control valve, and a compressor for returning gas from said low-pressure tank into said high-pressure accumulator and raising the pressure thereof, a pressure difference controller responsive to the difference in pressures of the gas in said low-pressure tank and said high-pressure accumulator for controlling the operation of said control valve and said compressor, a second controller responsive to the pressure in said low-pressure tank, a gas supply tank, a gas supply line from said gas supply tank into said low-pressure tank and which includes a feed-in valve, a gas discharge line to said gas supply tank from said low-pressure tank and which includes a discharge valve, and means controlled by said second controller for operating said feed-in and discharge valves in accordance with the change in gas pressure in said low-pressure tank, thereby to maintain a constant gas volume in said closed gas circulating system.

2. A closed gas circulating system as defined in claim 1 for a power switch wherein said second controller within said low-pressure tank exhibits characteristics consistent with a pressure-temperature course for constant gas densities with a constant pressure difference over the entire range of the operating gas temperature in contrast with a desired characteristic, and said pressure difference is compensated by the resilience of a spring independently of temperature.

3. A closed gas circulating system as defined in claim 1 for a power switch wherein said gas line between said low-pressure tank and high-pressure accumulator includes an auxiliary tank, and which further includes a third controller responsive to the gas pressure in said auxiliary tank for controlling operation of said compressor.

4. A closed gas circulating system as defined in claim 1 for a power switch and which further includes relay means pulsed upon a disconnection of said switch contacts, and means energized through the contacts of said relay means when so pulsed for turning on said compressor and opening said control valve in said gas line extending between said low-pressure tank and high-pressure accumulator.

5. A closed gas circulating system as defined in claim 1 for a power switch wherein said second controller includes a bellows mounted within said low-pressure tank, a relay contact actuating rod secured to said bellows, a housing situated within said bellows, and a compression spring situated within said housing, one end of said spring bearing against one end of said housing and the other end of said spring bearing against a retainer plate secured to said relay contact actuating rod.

References Cited

UNITED STATES PATENTS

| | | | |
|---|---|---|---|
| 2,911,507 | 11/1959 | Wood | 200—148 |
| 3,129,309 | 4/1964 | McKeough et al. | 200—148 |
| 3,250,970 | 5/1966 | Passaquin | 200—148 |
| 3,280,288 | 10/1966 | Frowein | 200—148 |
| 3,303,310 | 2/1967 | McKeough et al. | 200—148 |
| 3,311,726 | 3/1967 | Fish | 200—148 |

ROBERT S. MACON, *Primary Examiner.*